Dec. 15, 1936.   D. T. O'SULLIVAN   2,064,561
OPERATION OF INTERNAL COMBUSTION ENGINES
Filed Oct. 29, 1932
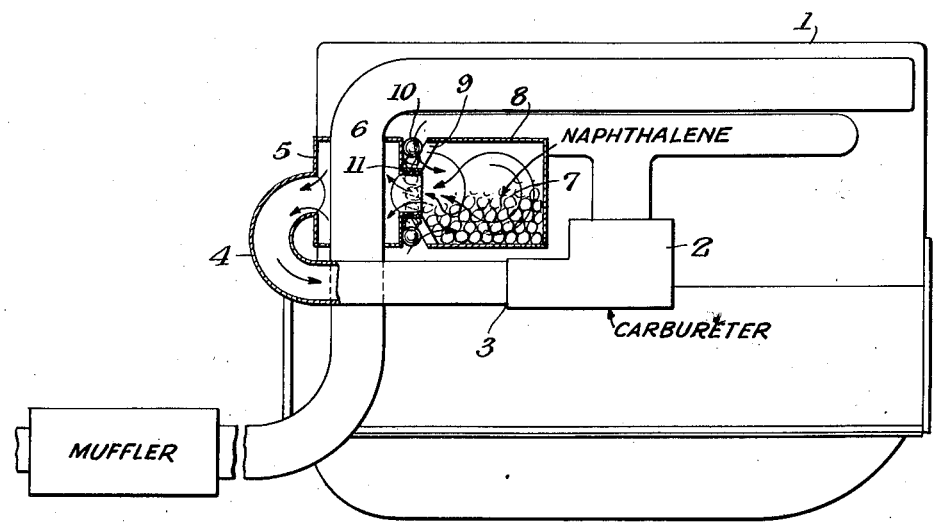

Patented Dec. 15, 1936

2,064,561

UNITED STATES PATENT OFFICE 2,064,561

OPERATION OF INTERNAL COMBUSTION ENGINES

Denis T. O'Sullivan, West Orange, N. J., assignor of one-half to Philip S. McLean, Bloomfield, N. J.

Application October 29, 1932, Serial No. 640,239½

5 Claims. (Cl. 123—198)

This invention relates to the operation of internal combustion engines and special objects of the invention are to improve the operating characteristics, particularly as to attaining more power, greater fuel economy with the reduction or elimination of "knocking" and freedom from carbon.

These and other desirable objects are attained by the novel features of invention hereinafter disclosed and claimed.

The drawing accompanying and forming part of this specification illustrates one embodiment of apparatus for practicing the invention, but it is to be understood that the structure may be modified and changed all within the true intent and broad scope of the claims.

In the drawing referred to the single view is a broken part sectional side elevation of one embodiment of apparatus suited to the carrying out of the invention.

It is known that the slightly volatile hydrocarbon, naphthalene mixes but poorly with regular gasoline when cold and that even when blended hot will separate and precipitate into its original crystals as it cools, making it impractical or undesirable because of its clogging effect in small passages such as present in the carbureter.

In the present invention, the advantageous effects of naphthalene are attained by interposing naphthalene ($C_{10}H_8$) in the air flow to the carbureter and thereby creating a naphthalenated air stream for carbureting the fuel of the engine.

In the present illustration, an internal combustion engine is represented at 1, having a carbureter 2, with an air intake at 3, connected by pipe 4, with a hot air "stove" 5, about the exhaust pipe 6.

A supply of naphthalene ($C_{10}H_8$) in solid commercial "moth ball" form is indicated at 7, supported in the air cleaner 8, at the entrance to the air intake passage. The air entering this cleaner at 9, is given a whirling motion and thus is made to penetrate and pass through the confined body of naphthalene. As a result, such air is highly charged with naphthalene fumes. This naphthalenated air has a particular affinity for the fuel, such as gasoline or kerosene, used in the engine, and blends with the same as an intimate combination of naphthalene and gasoline or other fuel fumes.

The naphthalene may be in the form of flakes or in other forms and may be supported in various ways to be taken up by the air employed for carburetion and combustion of the fuel. Thus the balls of naphthalene may be held in a spiral spring ring 10, hooked together about the pipe 11, just outside the air intake 9 of the air cleaner. Also instead of being in the metal air cleaner, the naphthalene may be contained in a cloth bag secured over the pipe 11. The metal container is advantageous in that it takes up heat from the exhaust pipe and adjacent engine structure, which heat makes the naphthalene more soluble in the air stream. The further heating of the naphthalene fumes in passage through the hot air stove is advantageous in effecting carburetion of the fuel by such naphthalenated air. The final mixture thus created has both anti-knock and anti-carbon properties.

I claim:

1. The herein disclosed method of improving performance characteristics of an internal combustion engine which operates on combustible mixture produced by the combination of a stream of air and fuel taken into the engine and which comprises interposing naphthalene ($C_{10}H_8$) in a solid form in the air stream flow to the engine at a point in advance of the mixture of the air stream with the fuel to effect fumation of the solid naphthalene by the air stream and applying heat to facilitate the fumation effected by the air stream.

2. The method of improving performance characteristics of an engine which operates on air taken through a fuel carburetor and which comprises supporting a body of naphthalene ($C_{10}H_8$) in the air intake of the carburetor and applying heat to said air stream which has passed over said naphthalene on its way to the carburetor to thereby create a preheated naphthalene-air compound for carbureting the fuel of the carburetor.

3. The herein disclosed method of operating an internal combustion engine, which comprises forming a naphthalenated air stream and then carbureting the fuel of the engine entirely with said naphthalenated air stream.

4. The herein disclosed method of creating an operating mixture for internal combustion engines, which comprises forming a highly naphthalenated air stream and then carbureting a liquid fuel of gasoline-kerosene characteristics entirely with said naphthalenated air stream.

5. The herein disclosed method of operating an internal combustion engine, which comprises naphthalenating the air stream necessary for operation of the engine, heating the naphthalenated air stream and carbureting the operating fuel of the engine with said heated naphthalenated air stream.

DENIS T. O'SULLIVAN.